US008714564B2

(12) United States Patent
Ogaeri et al.

(10) Patent No.: US 8,714,564 B2
(45) Date of Patent: May 6, 2014

(54) CYLINDER HEAD GASKET

(75) Inventors: Tomoyoshi Ogaeri, Toyota (JP); Shigeo Kiyoi, Toyota (JP); Masaki Chiba, Toyota (JP); Kazuya Yoshijima, Toyota (JP)

(73) Assignees: Nippon Gasket Co., Ltd., Toyota-shi, Aichi (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/877,394

(22) PCT Filed: Jul. 29, 2011

(86) PCT No.: PCT/JP2011/067397
§ 371 (c)(1),
(2), (4) Date: Apr. 2, 2013

(87) PCT Pub. No.: WO2012/056781
PCT Pub. Date: May 3, 2012

(65) Prior Publication Data
US 2013/0187344 A1 Jul. 25, 2013

(30) Foreign Application Priority Data
Oct. 26, 2010 (JP) ................................. 2010-239509

(51) Int. Cl.
F02F 11/00 (2006.01)

(52) U.S. Cl.
USPC ............................ 277/594; 277/591; 277/593

(58) Field of Classification Search
USPC .................................................. 277/590–598
See application file for complete search history.

(56) References Cited

U.S. PATENT DOCUMENTS

| 4,998,741 | A  | * | 3/1991  | Udagawa ........................ 277/595 |
| 6,076,833 | A  | * | 6/2000  | Geshi ............................ 277/595 |
| 6,698,765 | B2 | * | 3/2004  | Isogai ........................... 277/595 |
| 7,137,631 | B2 | * | 11/2006 | Udagawa et al. ............. 277/594 |

FOREIGN PATENT DOCUMENTS

| JP | 1-76544          | 5/1989 |
| JP | 2-14445          | 1/1990 |
| JP | 06-074343        | 3/1994 |
| JP | 2006-242294      | 9/2006 |
| JP | 2009-074478      | 4/2009 |
| WO | WO 2008/084718 A1 | 7/2008 |

OTHER PUBLICATIONS

International Search Report of PCT/JP2011/067397 (2 pgs.).

* cited by examiner

Primary Examiner — Gilbert Lee
(74) Attorney, Agent, or Firm — Flynn, Thiel, Boutell & Tanis, P.C.

(57) ABSTRACT

A cylinder head gasket 1 has gasket base plates 4 and 5 including: combustion chamber holes 7; a water hole 9 formed in a manner adjusted to the position of a cooling liquid path 3b formed in a cylinder block; and full beads 4a and 5a surrounding the combustion chamber holes.
Neighboring full beads are formed at locations distant from each other. Furthermore, two coupling beads 4b and 5b are provided at locations having disposed therebetween a centerline connecting the centers of the neighboring combustion chamber holes, and the two coupling beads 4b and 5b branch out from one full bead and join the other full bead and protrude in the same direction as the full beads.
The water hole is disposed outside an area surrounded by the full beads and the coupling beads.

5 Claims, 5 Drawing Sheets

CYLINDER HEAD GASKET

TECHNICAL FIELD

The present invention relates to cylinder head gaskets and, more particularly, to a cylinder head gasket comprising a gasket base plate including a plurality of combustion chamber holes and full beads surrounding the combustion chamber holes.

BACKGROUND ART

Conventionally, a cylinder head gasket is known which is put between a cylinder head and a cylinder block so that combustion gas in a cylinder bore is sealed. The cylinder head gasket comprises a gasket base plate including: a plurality of combustion chamber holes formed in a manner adjusted to the position of the cylinder bore formed in the cylinder block; a water hole formed in a manner adjusted to the position of a cooling liquid path formed in the cylinder block; and full beads surrounding the combustion chamber holes (Patent Document 1). When the cylinder head gasket of this type is mounted on an engine, the combustion chamber holes may be disposed at a distance from each other. In this case, the full beads surrounding the combustion chamber holes may be formed at locations distant from each other.

PRIOR ART DOCUMENTS

Patent Documents

Patent Document 1: International Publication No. WO 2008-084718.

SUMMARY OF INVENTION

Problems to be Solved by the Invention

As described in Patent Document 1, in a case where the full beads are disposed at a distance from each other, when the cylinder head gasket is put between the cylinder head and the cylinder block, a satisfactory contact pressure may not be provided between the full beads.

In this case, when the cooling liquid flowing through the water hole into an area between the cylinder head and the cylinder block enters an area between the full beads and is vaporized by heat transmitted from the cylinder bore, a coating applied to the gasket base plate may be damaged.

To address the above described problem which arises when the full beads are disposed at a distance from each other, the present invention provides a cylinder head gasket which can block the cooling liquid from entering the area between the full beads.

Means for Solving the Problems

That is, a cylinder head gasket according to the present invention comprises a gasket base plate including: a plurality of combustion chamber holes formed in a manner adjusted to a position of a cylinder bore formed in a cylinder block; a water hole formed in a manner adjusted to a position of a cooling liquid path formed in the cylinder block; and full beads surrounding the combustion chamber holes, the cylinder head gasket having the neighboring full beads formed at locations distant from each other. In the cylinder head gasket, while the neighboring full beads are close to each other, two coupling beads are provided at locations having disposed therebetween a centerline connecting the centers of the neighboring combustion chamber holes, the two coupling beads branching out from one full bead and joining the other full bead and protruding in the same direction as the full beads. Furthermore, the coupling beads are arranged so that the water hole is disposed outside an area surrounded by the full beads and the coupling beads.

Advantageous Effects of Invention

In the inventive cylinder head gasket, the area between the full beads is partitioned by the coupling beads and, furthermore, the water hole is disposed outside this area. Accordingly, the cooling liquid is blocked from flowing into this area so as to prevent the vaporization of cooling liquid from damaging the coating.

MODE FOR CARRYING OUT THE INVENTION

Figure 1:
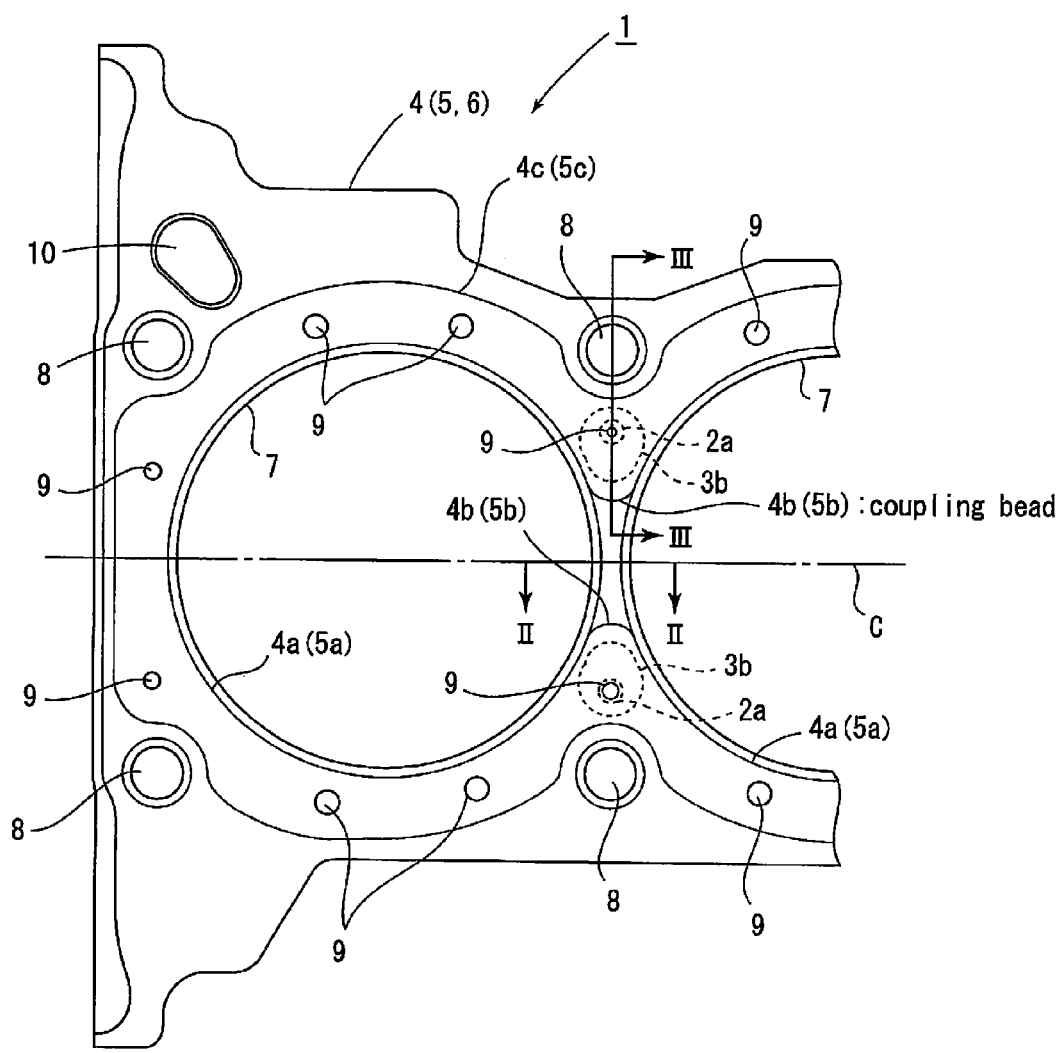
FIG. 1 is a plan view of a cylinder head gasket illustrating a first embodiment.
Figure 2:
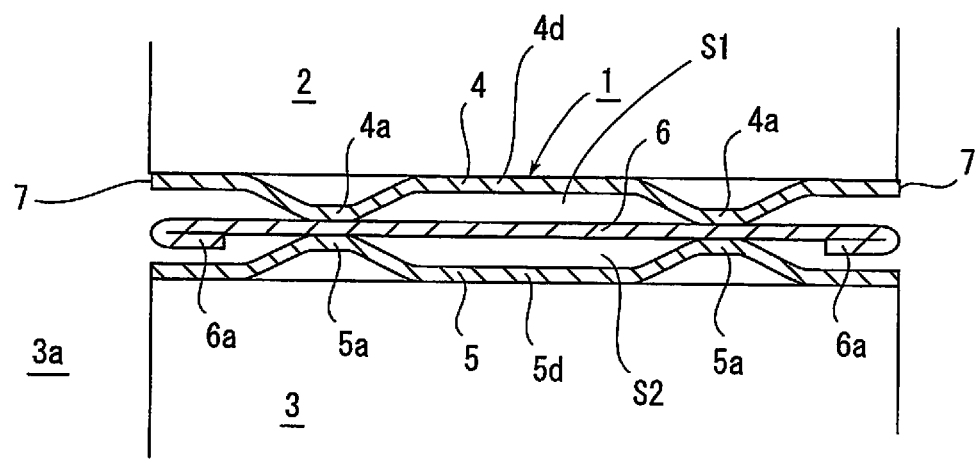
FIG. 2 is an enlarged sectional view of the cylinder head gasket along the line II-II illustrated in FIG. 1.
Figure 3:
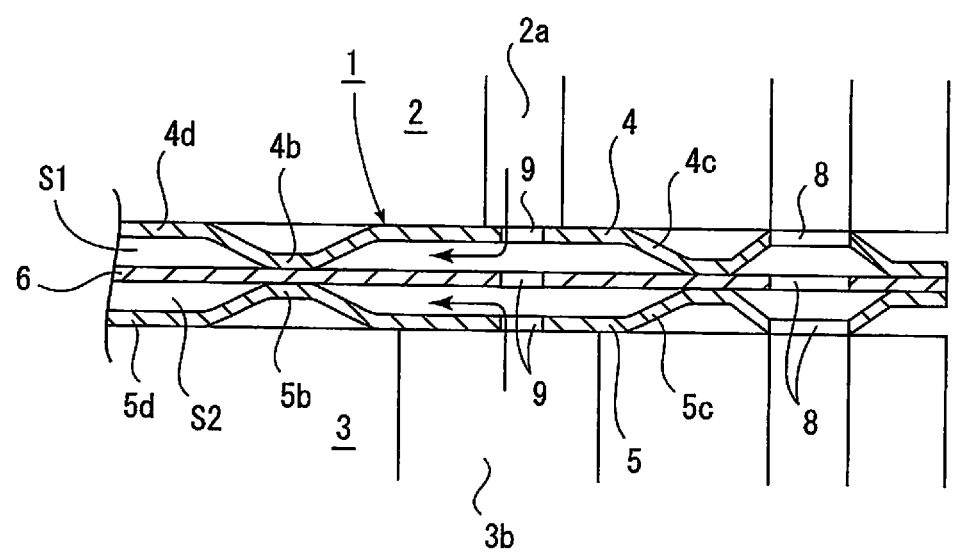
FIG. 3 is an enlarged sectional view of the cylinder head gasket along the line III-III illustrated in FIG. 1.
Figure 4:
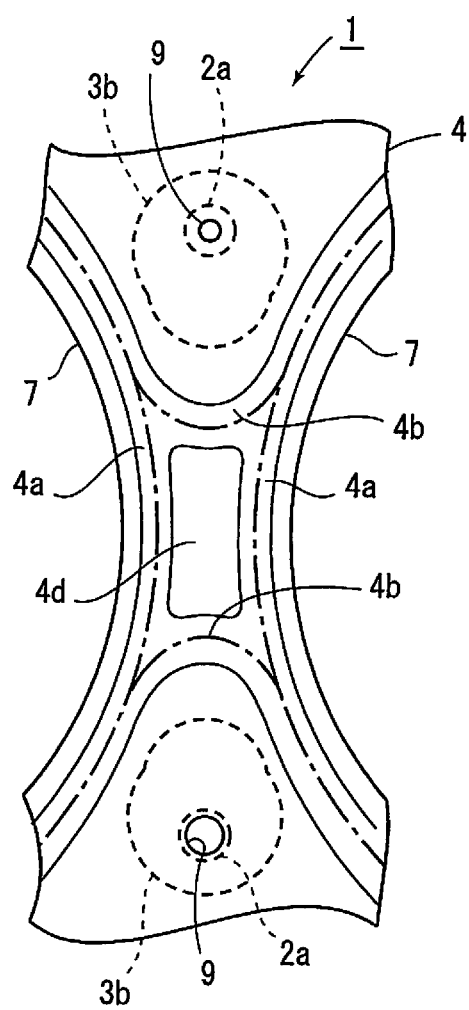
FIG. 4 is a substantial enlarged view of the cylinder head gasket illustrated in FIG. 1.

Embodiments will be described below with reference to the drawings. FIGS. 1 to 4 illustrate a cylinder head gasket 1 according to a first embodiment; FIG. 1 is a plan view of the cylinder head gasket 1; FIG. 2 is a sectional view of the cylinder head gasket 1 along the line II-II illustrated in FIG. 1; FIG. 3 is a sectional view of the cylinder head gasket 1 along the line III-III illustrated in FIG. 1; and FIG. 4 is a substantial enlarged view in the plan view of the cylinder head gasket 1.

The cylinder head gasket 1 includes: a pair of gasket base plates 4 and 5 in contact with a cylinder head 2 and a cylinder block 3; and an intermediate sheet 6 disposed between the pair of gasket base plates 4 and 5.

The gasket base plates 4 and 5 and the intermediate sheet 6 are made of SUS301-H. The thickness of these sheets is set to the same value, that is, approximately 0.2 mm in the present embodiment. In order to achieve an anti-fatigue effect and to improve the sealing performance, a coating of approximately 25 μm formed of rubber of fluorine, nitrile or other family is applied on the whole upper and lower surfaces of the gasket base plates 4 and 5 (not illustrated).

In the gasket base plates 4 and 5 and the intermediate sheet 6, the following holes are, as illustrated in FIG. 1, provided: a combustion chamber hole 7 formed at a location of a cylinder bore 3a formed in the cylinder block 3; a plurality of bolt holes 8 through which fastening bolts are inserted; a plurality of water holes 9 used to circulate a cooling liquid; and an oil hole 10 used to circulate a lubricating oil.

Referring to the water holes 9, two water holes 9 disposed between the neighboring combustion chamber holes 7 are formed in a manner arrayed in a direction orthogonal to the centerline C connecting the centers of the neighboring cylinder bores 3a.

In the cylinder head 2 and the cylinder block 3, cooling liquid paths 2a and 3b used to circulate cooling liquid are formed at locations corresponding to the two water holes 9. On the lower surface of the cylinder head 2, the cooling liquid path 2a on the side of the cylinder head 2 has an opening of a diameter slightly greater than the water hole 9; on the upper surface of the cylinder block 3, the cooling liquid path 3b on the side of the cylinder block 3 has an opening of a diameter greater than the cooling liquid path 2a on the side of the cylinder head 2 (refer to FIGS. 3 and 4).

It is noted that FIG. 1 illustrates only the cooling liquid paths 2a and 3b corresponding to the two water holes 9 disposed between the combustion chamber hole 7 and the combustion chamber hole 7, but cooling liquid paths (not illustrated) are also formed at locations corresponding to the other water holes 9.

In the pair of gasket base plates 4 and 5, the following beads are formed: full beads 4a and 5a having a circular shape which surround each of the combustion chamber holes 7 in a manner having no end portion; two coupling beads 4b and 5b which couple the neighboring full beads 4a and 5a, respectively; and half beads 4c and 5c formed along the outer edge portions of the gasket base plates 4 and 5. Referring to FIG. 1, the solid lines indicating the full beads 4a and 5a and the coupling beads 4b and 5b show edges of top portions of each beads.

The full beads 4a and 5a are formed in a manner protruding toward the intermediate sheet 6 from the gasket base plates 4 and 5. In the engine according to the present embodiment, the neighboring cylinder bores 3a are disposed at a longer distance from each other and thus, flat sections 4d and 5d are formed between the full beads 4a and 5a, respectively.

The coupling beads 4b and 5b will be described below. However, only the coupling bead 4b provided in the gasket base plate 4 on the side of the cylinder head 2 will be described here, and an explanation of the coupling bead 5b provided in the gasket base plate 5 on the side of the cylinder block 3 is omitted.

While the full bead 4a and the full bead 4a are close to each other, the coupling beads 4b are provided at locations having disposed therebetween the centerline C described above, and the coupling beads 4b branches out from one full bead 4a and joins the other full bead 4a.

The coupling bead 4b, as illustrated in FIG. 3, protrudes from the gasket base plate 4 in the same direction as the full bead 4a, and is formed so as to have the same height as the full bead 4a.

The coupling bead 4b is provided so as to branch out from one full bead 4a in a tangential direction and joins the other full bead 4a, and is formed as a circular arc so as to smoothly couple the full bead 4a and the full bead 4a.

The coupling bead 4b is disposed between the two water holes 9 disposed between the combustion chamber hole 7 and the combustion chamber hole 7; and the coupling bead 4b is arranged so as not to overlap the cooling liquid paths 2a and 3b disposed respectively in the cylinder head 2 and the cylinder block 3.

Referring to FIG. 4, the edges of the top portions of the full bead 4a and the coupling bead 4b are indicated by a dashed-dotted line, and the base portions thereof, by a solid line; it is shown that the base portions of the full bead 4a and the coupling bead 4b are smoothly connected.

The half beads 4c and 5c are formed along the outer edge portions of the gasket base plates 4 and 5. The outer circumferential end portions of the half beads 4c and 5c protrude toward the intermediate sheet 6. The half beads 4c and 5c are in contact with the cylinder head 2 and the cylinder block 3, respectively.

To be more in detail, the half beads 4c and 5c are, as illustrated in FIG. 1, formed so as to surround the water holes 9 disposed around the full beads 4a and 5a and so as to pass between the water holes 9 and the bolt holes 8.

When the half beads 4c and 5c are provided, cooling liquid circulating through the water holes 9 are prevented from leaking from the area between the cylinder head 2 and the cylinder block 3 to the outside.

The intermediate sheet 6 is formed so as to have a shape of flat plate, its planar shape being the same as that of the gasket base plates 4 and 5. In the intermediate sheet 6, the water holes 9 and the oil holes 10 are arranged, but the full bead, coupling bead, and half bead described below are not formed.

A folding section 6a obtained by folding back the inner circumference end portion of the material toward the outside of the combustion chamber hole 7 is, as illustrated in FIG. 2, formed in the intermediate sheet 6 at the location of the combustion chamber hole 7 so as to surround the combustion chamber hole 7. The outer circumference end portion of the folding section 6a is positioned on the inner side relative to the base section of the full beads 4a and 5a.

Instead of the folding section 6a, a thin-plate-shaped shim may be secured to the surface of the intermediate sheet 6.

When the cylinder head gasket 1 having the above described structure is put between the cylinder head 2 and the cylinder block 3, the full beads 4a and 5a of the gasket base plates 4 and 5 are compressed while being elastically deformed, whereby exhaust gas is prevented from leaking from the combustion chamber hole 7.

Furthermore, the folding section 6a is formed in the intermediate sheet 6 so as to surround the combustion chamber hole 7; thus the loading in the periphery of the combustion chamber hole 7 can be increased, whereby sealing performance at the periphery of the combustion chamber hole 7 is improved.

The cylinder head gasket 1 according to the present embodiment has a structure in which the full beads 4a and 5a and the full beads 4a and 5a surrounding the combustion chamber holes 7 are coupled by the two coupling beads 4b and 5b.

When the aforementioned coupling beads 4b and 5b are provided, the flat sections 4d and 5d formed in the gasket base plates 4 and 5 are surrounded by the two full beads 4a and 5a and the two coupling beads 4b and 5b.

In this way, in the area surrounded by the two full beads 4a and 5a and the two coupling beads 4b and 5b, a space S1 is formed between the flat section 4d of the gasket base plate 4 and the cylinder head 2, and a space S2 is formed between the flat section 5d of the gasket base plate 5 and the cylinder block 3.

Meanwhile, the coupling beads 4b and 5b are formed on the side of the centerline C relative to the water holes 9; and the water holes 9 are positioned on the outer side relative to the flat sections 4d and 5d. Accordingly, the two full beads 4a and 5a and the two coupling beads 4b and 5b prevent from flowing into the spaces S1 and S2, cooling liquid flowing through the water holes 9 into the area between the cylinder head 2 and the cylinder block 3.

Particularly, the coupling beads 4b and 5b are arranged so as not to overlap the openings of the cooling liquid paths 2a and 3b formed in the cylinder head 2 and the cylinder block 3, and thus cooling liquid is blocked from flowing into the spaces S1 and S2.

In this way, the coupling beads 4b and 5b block cooling liquid from flowing into the spaces S1 and S2; accordingly, the coating applied to the flat sections 4d and 5d disposed between the neighboring combustion chamber holes 7 can be prevented from being damaged.

That is, in the conventional cylinder head gasket having full beads disposed distant from each other, the contact pressure of the flat section is low, creating a state in which cooling liquid easily flows through the water hole into the flat section.

As a result, a problem arises: that is, the gasket base plates 4 and 5 in the periphery of the combustion chamber hole 7 is heated by explosion in the cylinder bore 3a, and cooling liquid reaching the flat section is evaporated by the transmitted heat, and the coating is damaged by the resultant steam and thus peels off.

The coupling beads 4b and 5b branch out from the full beads 4a and 5a in a tangential direction. Accordingly, in areas where these beads are joined, a constant contact pressure is provided, allowing contact pressure adjustments to be easily performed.

In the present embodiment, the coupling beads 4b and 5b are formed particularly so as to branch out toward the centerline C connecting the combustion chamber hole 7 and the combustion chamber hole 7; thus the coupling beads 4b and 5b can be formed along the opening of the cooling liquid path 3b formed in the cylinder block 3 and furthermore the contact pressure on the side of the water holes 9 in the coupling beads 4b and 5b and the full beads 4a and 5a can be stabilized while a constant width of the coupling beads 4b and 5b is provided between the top section thereof and the base section on the side of the water holes 9.

Figure 5:
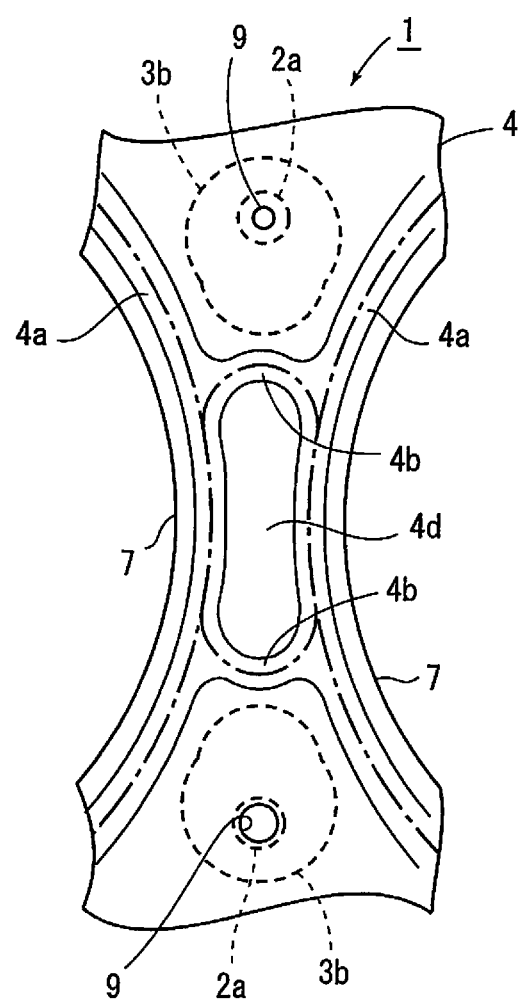
FIG. 5 is a substantial enlarged view of a cylinder head gasket illustrating a second embodiment.
Figure 6:
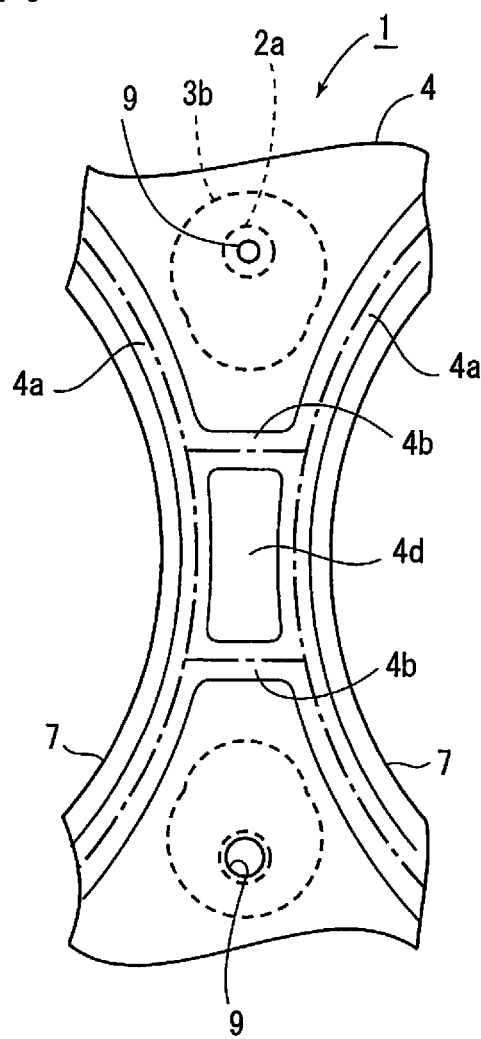
FIG. 6 is a substantial enlarged view of a cylinder head gasket illustrating a third embodiment.

FIGS. 5 and 6 are substantial enlarged views of a cylinder head gasket 1 according to a second embodiment and a third embodiment, respectively. Parts corresponding to those of the first embodiment will be described using the same reference characters and an explanation thereof is omitted.

In the cylinder head gasket 1 according to the second embodiment illustrated in FIG. 5, the coupling beads 4b and 5b similarly branch out in a tangential direction relative to the full beads 4a and 5a, but are formed so as to branch out in a direction increasing the distance from the centerline C connecting the combustion chamber hole 7 and the combustion chamber hole 7.

In the cylinder head gasket 1 according to the second embodiment, a constant width of the coupling beads 4b and 5b can be provided between the top section thereof and the base section on the side of the spaces S1 and S2; thus the contact pressure on the side of the flat surfaces 4d and 5d can be stabilized in the coupling beads 4b and 5b and the full beads 4a and 5a.

In the cylinder head gasket 1 according to the third embodiment illustrated in FIG. 5, the coupling beads 4b and 5b are formed so as to couple in a linear shape the full beads 4a and 5a and the full beads 4a and 5a.

In this way, in the cylinder head gasket 1 according to the second embodiment and in the cylinder head gasket 1 according to the third embodiment, the contact pressure in the flat sections 4d and 5d formed between the combustion chamber hole 7 and the combustion chamber hole 7 can be raised so that sealing performance is improved.

REFERENCE SIGNS LIST 1 cylinder head gasket
2 cylinder head
3 cylinder block
4, 5 gasket base plate
4a, 5a full bead
4b, 5b coupling bead
4d, 5d flat section (area)
S1, S2 space

The invention claimed is:
1. A cylinder head gasket comprising a gasket base plate having a plurality of combustion chamber holes formed at a position corresponding to a cylinder bore in a cylinder block; a water hole formed at a position corresponding to a cooling liquid path formed in the cylinder block; a full bead surrounding each combustion chamber hole and two coupling beads opposing each other on opposite sides of a centerline connecting the centers of neighboring combustion chamber holes, wherein neighboring full beads are spaced apart from each other, the coupling beads extend between and join the neighboring full beads, protrude in the same direction as the full beads and are arranged so that the water hole is disposed outside of an area surrounded by the neighboring full beads and the coupling beads and the surrounded area in the gasket plate form a flat section which is in close contact with the cylinder block.

2. The cylinder head gasket according to claim 1, wherein the coupling beads branch out in a tangential direction from the full beads and have a circular arc shape.

3. The cylinder head gasket according to claim 2, wherein the coupling beads have a circular arc shape toward the centerline.

4. The cylinder head gasket according to claim 1, wherein a plurality of water holes arrayed in a direction orthogonal to a direction in which the combustion chamber holes are arrayed, are provided between the combustion chamber holes, and the coupling beads are formed between the water holes.

5. The cylinder head gasket according to claim 1, wherein the coupling beads have an opening on a surface of the cylinder block and are disposed so as not to overlap the cooling liquid path which communicates with the water hole.

* * * * *